United States Patent
Ribeiro et al.

(10) Patent No.: US 12,026,721 B2
(45) Date of Patent: Jul. 2, 2024

(54) TRANSACTION VISUALIZATION TOOL

(71) Applicant: Uphold, Inc., New York, NY (US)

(72) Inventors: Tiago Ribeiro, New York, NY (US); Sameer Ismail, New York, NY (US); Cem Miralay, New York, NY (US)

(73) Assignee: UPHOLD, INC., New York, NY (US)

( * ) Notice: Subject to any disclaimer, the term of this patent is extended or adjusted under 35 U.S.C. 154(b) by 268 days.

(21) Appl. No.: 17/505,558

(22) Filed: Oct. 19, 2021

(65) Prior Publication Data

US 2022/0122092 A1 Apr. 21, 2022

Related U.S. Application Data

(60) Provisional application No. 63/093,591, filed on Oct. 19, 2020.

(51) Int. Cl.
*G06F 3/0481* (2022.01)
*G06Q 30/018* (2023.01)

(52) U.S. Cl.
CPC ....... *G06Q 30/0185* (2013.01); *G06F 3/0481* (2013.01)

(58) Field of Classification Search
CPC .............. G06Q 30/0185; G06F 3/0481; G06F 3/04817; G06F 3/0482; G06F 3/04842
See application file for complete search history.

(56) References Cited

U.S. PATENT DOCUMENTS

| | | | |
|---|---|---|---|
| 9,787,705 B1 | 10/2017 | Love et al. | |
| 2005/0222929 A1 | 10/2005 | Steier et al. | |
| 2010/0169137 A1* | 7/2010 | Jastrebski | G06Q 20/04 |
| | | | 705/30 |
| 2016/0026939 A1* | 1/2016 | Schiffer | G06F 40/166 |
| | | | 705/7.11 |

(Continued)

FOREIGN PATENT DOCUMENTS

WO WO-2020/206204 10/2020

OTHER PUBLICATIONS

Ramino Camino et al., Finding Suspicious Activities in Financial Transactions and Distributed Ledgers, Nov. 1, 2017, IEEE Conference on Data Mining Workshops, pp. 787-796 (Year: 2017).*

(Continued)

*Primary Examiner* — Tam T Tran
(74) *Attorney, Agent, or Firm* — FOLEY & LARDNER LLP

(57) ABSTRACT

Disclosed herein are methods and systems of visually representing and tracking transactions on a graphical user interface to identify fraudulent or money-laundering entities. A server may receive data corresponding to a plurality of transactions for display on the graphical user interface as a set of graphical nodes linked by a set of graphical components. When the server receives a selection of a graphical node from a user, the server may display on the graphical interface a first subset of graphical nodes directly linked by a first subset of graphical components to the selected graphi- (Continued)

cal node, a visual attribute of each of the first subset of graphical components directly linked to the selected graphical node, and a second subset of graphical nodes indirectly linked by a second subset of graphical components having at least one degree of separation from the selected graphical node.

20 Claims, 5 Drawing Sheets

(56) References Cited

U.S. PATENT DOCUMENTS

| | | | |
|---|---|---|---|
| 2017/0178139 A1* | 6/2017 | Gieseke | G06Q 30/0185 |
| 2019/0303494 A1* | 10/2019 | Meyer | G06Q 30/01 |
| 2020/0272959 A1 | 8/2020 | Mattsson et al. | |
| 2021/0117978 A1* | 4/2021 | Silva | G06Q 20/4016 |

OTHER PUBLICATIONS

Catarina Macas et al., VaBank: Visual Analytics for Banking Transactions, Sep. 1, 2020, International Conference Information Visualisation, pp. 336-343 (Year: 2020).*

Extended European Search Report for EP 21203550.5 dated Feb. 25, 2022 (8 pages).

* cited by examiner

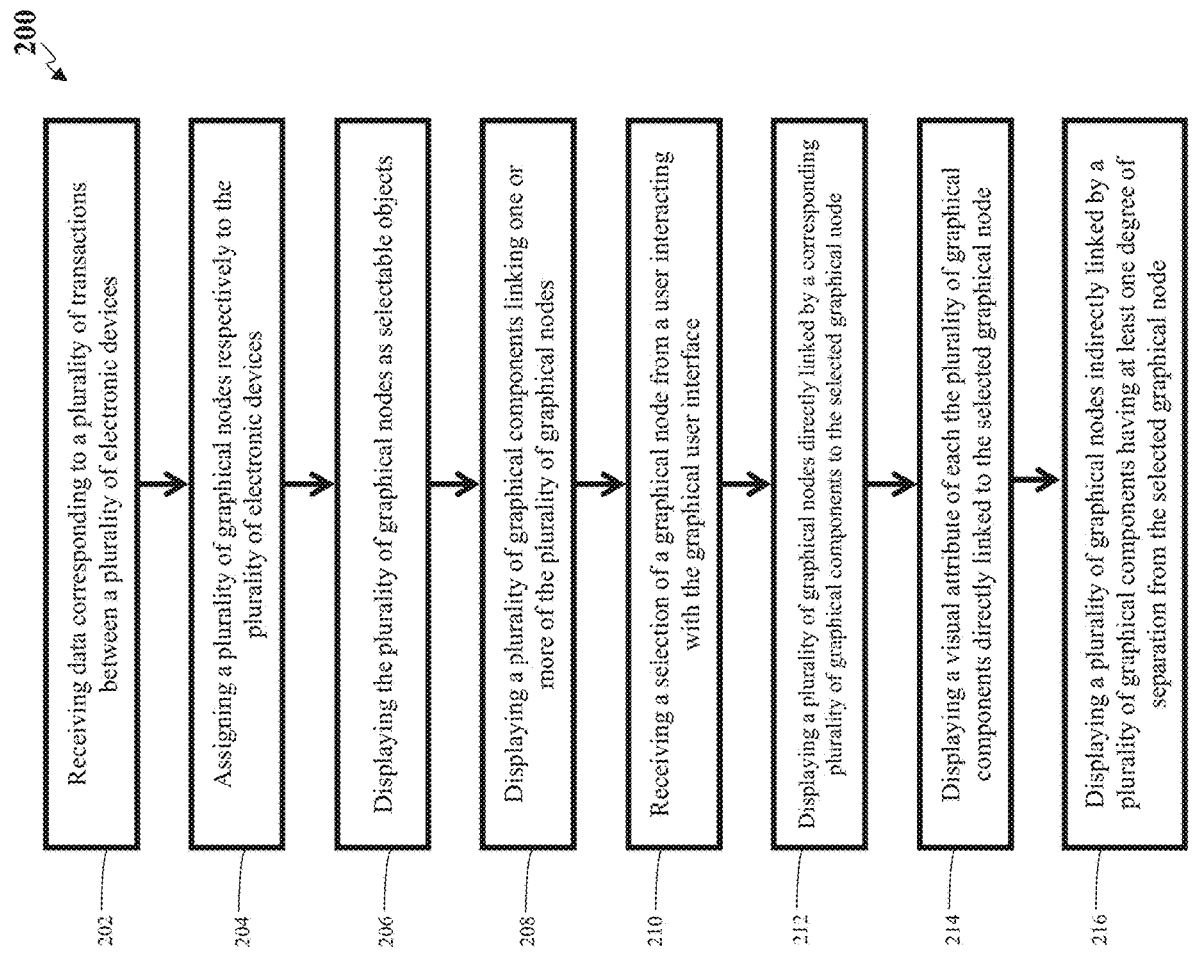

TRANSACTION VISUALIZATION TOOL

CROSS-REFERENCE TO RELATED APPLICATIONS

This application claims priority to U.S. Provisional Application No. 63/093,591, filed Oct. 19, 2020, which is incorporated by reference in its entirety for all purposes.

TECHNICAL FIELD

This application relates generally to tracking transactions to monitor for fraudulent transactions or entities.

BACKGROUND

As more entities utilize electronic payment methods, such as through online portals or currency transfer applications, it has become more difficult to determine which transactions, if any, are being routed to fraudulent entities. Conventional fraud detection systems track transactions linked to bank-related accounts, and issue notifications related to possible fraudulent transactions based on their location or merchant. However, such applications face technical shortcomings. Conventional systems may not be able to track the route of a transaction to a final destination and can only determine the initial withdrawal of funds, thereby enabling fraudulent entities to route transactions through seemingly legitimate merchants or webservers to disguise illegitimate transactions. Moreover, even if such systems track transactions to a final destination that registers as a fraudulent entity, a user interface of the system often only provides a user with a list of possibly fraudulent transactions as opposed to the additional transaction information used to determine a transaction's fraudulent status.

SUMMARY

For the aforementioned reasons, there is a desire for a software solution for visually representing and tracking transactions on a graphical user interface (method and system) to address the above-described challenges. There is a desire for a software solution in form of a transaction visualization tool providing a user interface on different aspects of transactions can be visualized in an interconnected nodal data structure. For example, each node in the interconnected data structure may represent a user or a device used for a transaction. The nodes may be further characterized by a location, entity type, or any other attribute of previously conducted transactions recorded by the visualization tool. Each node may be connected by one or more lines or similar graphical component linking two nodes indicating a transaction. The graphical component may be further characterized by a transaction type such as a withdrawal, deposit, credit, or debit-type transaction, or by the payment method used to complete the transaction. The interconnected nodal data structure can be customized and filtered according to different search features such as time period, transaction type, entity type, or the like.

Using the methods and systems described herein, a user may access the visualization tool through a device associated with the user, which displays the visualization tool as a user interface. The user interface may allow the user view transactions from different accounts associated with the user, such as bank accounts or currency transfer applications, and access various aspects (e.g., a transaction or another device associated with a user) of the interconnected nodal data structure to have a holistic view of transactions occurring within the platform. The holistic view displayed by the visualization tool can display a plurality of nodes and transaction, and may be used to identify fraudulent or potentially money-laundering entities. Using the visualization methods discussed herein, end users viewing the graphical user interfaces discussed herein can easily and quickly view transactions and identify possibly fraudulent transactions.

In one embodiment, a method comprises receiving, by a server, data corresponding to a plurality of transactions between a plurality of electronic devices; displaying, by the server on the graphical user interface, a set of graphical nodes representative of the plurality of electronic devices as selectable objects, each graphical node of the set of graphical nodes having a visual attribute corresponding to an attribute of the respective electronic device; displaying, by the server on the graphical user interface, a set of graphical components linking one or more of the set of graphical nodes, each graphical component of the set of graphical components corresponding to a respective transaction of the plurality of transactions; in response to receiving a selection of a graphical node from a user interacting with the graphical user interface: displaying, by the server, a first subset of graphical nodes directly linked by a first subset of graphical components to the selected graphical node; displaying, by the server, a visual attribute of each of the first subset of graphical components directly linked to the selected graphical node; and displaying, by the server, a second subset of graphical nodes indirectly linked by a second subset of graphical components having at least one degree of separation from the selected graphical node.

In one embodiment, a system comprises a server comprising a memory and a processor, the server configured to receive data corresponding to a plurality of transactions between a plurality of electronic devices, the server also configured to present for display on a graphical user interface, the non-transitory computer-readable memory comprising instructions that when executed by the processor: display a set of graphical nodes as selectable objects, each of the set of graphical nodes having a visual attribute corresponding to an attribute of a respective electronic device; display a set of graphical components linking one or more of the set of graphical nodes, the set of graphical components corresponding respectively to the plurality of transactions; and in response to receiving a selection of a graphical node from a user interacting with the graphical user interface: display a first subset of graphical nodes directly linked by a first subset of graphical components to the selected graphical node; display visual attribute of each of the first subset of graphical components directly linked to the selected graphical node; and display a second subset of graphical nodes indirectly linked by a second subset of graphical components having at least one degree of separation from the selected graphical node.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings constitute a part of this specification, illustrate an embodiment of the disclosure, and together with the specification, explain the methods, systems disclosed herein.

FIG. 2 illustrates a flowchart depicting operational steps for visually representing and tracking transactions on a graphical user interface, according to an embodiment.

DETAILED DESCRIPTION

Figure 1:
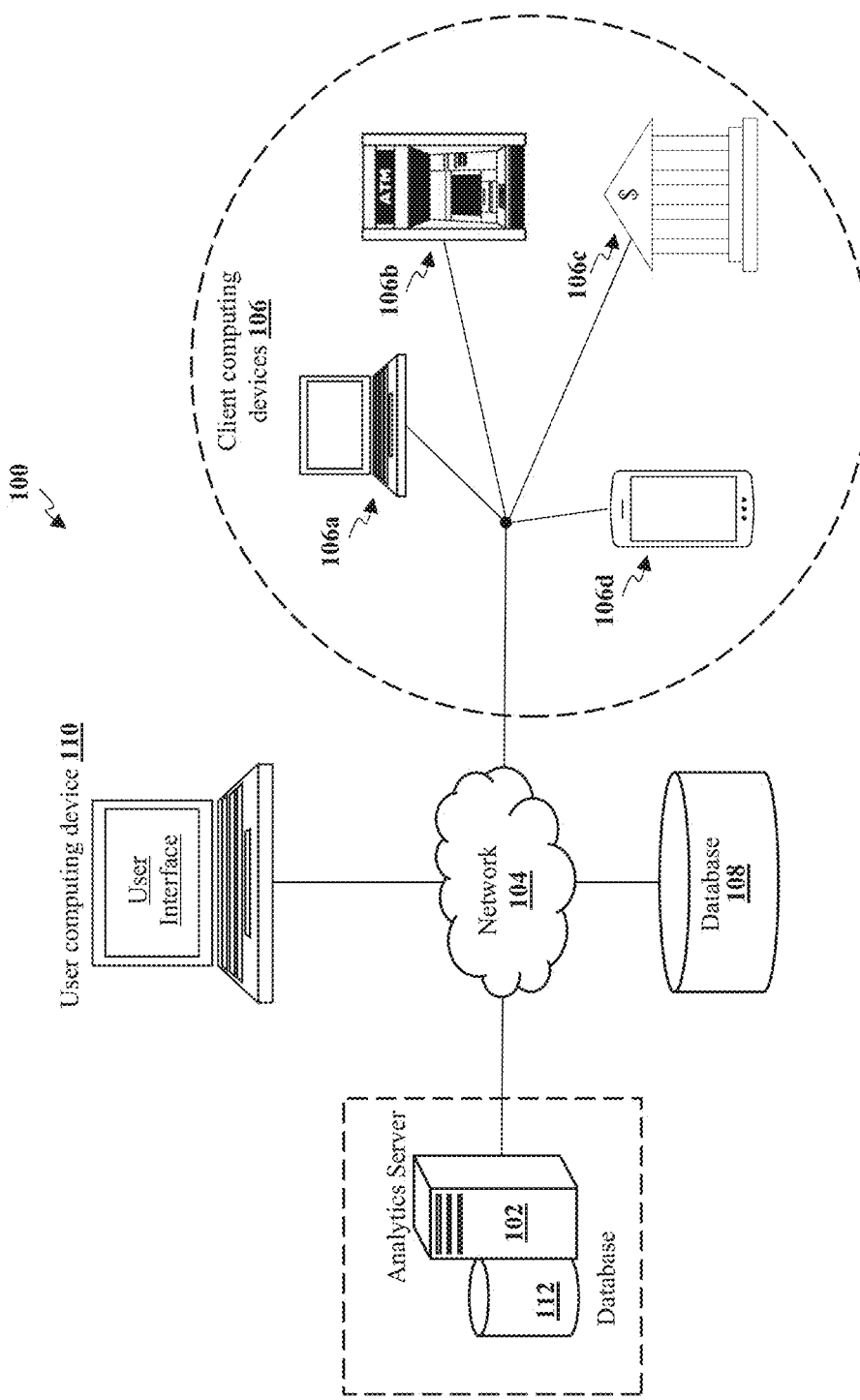
FIG. 1 illustrates an example of a computer system for visually representing and tracking transactions on a graphical user interface, according to an embodiment.

Reference will now be made to the embodiments illustrated in the drawings, and specific language will be used here to describe the same. It will nevertheless be understood that no limitation of the scope of the methods/systems is thereby intended. Alterations and further modifications of the inventive features illustrated here, and additional applications of the principles of the methods/systems described herein as illustrated here, which would occur to a person skilled in the relevant art and having possession of this disclosure, are to be considered within the scope of the methods and systems described herein.

FIG. 1 illustrates components of a system 100 for visually representing and tracking transactions on a graphical user interface, according to an embodiment. As shown in FIG. 1, the system 100 may comprise an analytics server 102, a network 104, a plurality of client computing devices 106a-d, a database 108, a user computing device 110, and a server database 112. Aspects of the system 100 may be configured to display one or graphical user interfaces illustrating interconnected nodal data structures on user computing device 110. Various features of the system 100 may be connected to each other using a network, such as network 104. Network 104 may be any synchronous or asynchronous network. Network 104 may be any wired or wireless network configured to enable communication between the components of system 100.

System 100 may collect transaction information from a plurality of sources such as electronic devices related to different transactions performed by said sources. A transaction in this context is an exchange of currency between at least two electronic devices of the plurality of electronic devices. The transactions may be associated with financial accounts of a user of system 100. For example, client computing devices 106a-d may transmit via network 104 data including transaction information created by client computing devices 106a-d during electronic transactions to analytics server 102. Client computing devices 106a-d may be programmed to periodically send the data to analytics server 102, or analytics server 102 may periodically request data from client computing devices 106a-d. Client computing devices 106a-d may push the data including the transaction information to database 108 for long-term storage, and transmit a notification to analytics server 102 after completion. Upon receiving the notification, analytics server 102 may pull the data from the database 108 and for storage in server database 112. System 100 may further include a user computing device 110, through which a user may access a graphical user interface (GUI) created by analytics server 102. A user may send a request to access the GUI from user computing device 110. Upon receiving the request, analytics server 102 may create the GUI from the data including the transaction information, and cause user computing device 110 to display the GUI. Analytics server 102 may further generate an interconnected nodal data structure for display on the GUI. The interconnected nodal data structure consists of a series of nodes linked to each other by lines or other graphical components. The nodes represent entities that are party to a transaction, and the lines represent said transaction, according to some embodiments. The GUI may also be referred to as a transaction visualization tool, or simply a visualization tool.

The analytics server 102 may function as a system controller. For example, analytics server 102 may comprise a processor, such as a central processing unit (CPU), micro processing unit (MPU), a programmable circuit, or other processing device configured to connect to network 104 via a wired or wireless connection and a memory configured to store instructions or programs that, when executed by the processor, allow the processor to generate the interconnected nodal data structure for display on the GUI. The server database 112 functions as the memory. The programs, when executed, may be configured to pull the data from database 108, and process the data to generate a set of transactions and set of nodes representing entities between which the set of transactions are taking place. Analytics server 102 determines corresponding data including a time, a location, an amount, a transaction type, an entity type of the nodes between which a transaction took place, attributes of the originating account (e.g., an account number), attributes of the receiving account (e.g., an account number), whether the transaction was cryptocurrency or fiat currency (e.g., currency issued by a government entity such as Dollars, Euros, etc.), whether the transaction took place through a transaction platform, or the like for each transaction in the set of transactions. Analytics server 102 may store the set of transactions, the set of nodes, and the corresponding data in server database 112 or database 108.

In some embodiments, analytics server 102 generates or hosts a platform accessible from any one of client computing devices 106 on which users can access the platform and implement or facilitate transactions (e.g., send or receive money using various accounts holding real or virtual assets). In such an embodiment, analytics server 102 may receive data including transaction information directly from client computing devices 106 through network 104, not requiring contact with database 108. Analytics server 102 may process the data to extract transaction information (e.g., a time, a location, an amount, a transaction type, an entity type of the nodes between which a transaction took place, attributes of the originating account, attributes of the receiving account, whether the transaction was cryptocurrency or fiat currency), which may be stored in server database 112 or database 108.

The entities (e.g., client computing devices 106) represented by the set of nodes include a personal computer 106a and a smart phone 106d. Personal computer 106a and smart phone 106d may comprise a processor communicatively coupled to network 104. Personal computer 106a and smart phone 106d may be configured to access the Internet to send transaction information that occurs between the respective client computing devices 106 and an outside entity. For example, personal computer 106a and smart phone 106d may perform purchases online through different webservers, which may be linked to various currency transfer accounts, credit card accounts or the like. When processed, analytics server 102 may display the transaction as an interaction between a user node and a merchant node, a location node indicating an Internet Protocol (IP) address, another user node, or a cryptocurrency node. A node representing a user may be a registered user, such as a user who has registered credentials and accounts, or an un-registered user, such as a user who is identified as a second party of a transaction but does not have registered credentials and accounts with system 100. In alternative embodiments, nodes indicating users (or personal entities) other than the user logged in to the system 100 on user computing device 110 are displayed in a first color, and a node indicating the user presently logged in on user computing device 110 are displayed in second, different color.

Entities (e.g., client computing devices 106) represented by the set of nodes include an ATM 106b and a bank 106c. Analytics server 102 may obtain data associated with bank-related transactions a number of different ways. For example, ATM 106b may comprise a processor communicatively coupled to network 104 and configured to communicate directly with analytics server 102. ATM 106b may also be configured to communicate with a bank-managed server monitoring various bank accounts associated with bank 106c (not shown). Analytics server 102 may request bank-related transaction data from such a server, thereby receiving data from both ATM 106b and bank 106c. In addition, bank-related transaction data may be manually entered, web-scraped from a mobile banking application associated with bank 106c on a user's personal electronic device provided by the user to analytics server 102, web-scraped from an online portal associated with bank 106c provided by the user to analytics server 102, or the like. Transactions associated with ATM 106b and bank 106c may have a transaction type such as a withdrawal, deposit, transfer, or check-related transaction.

Analytics server 102 may vary the appearance of nodes based on entity or transaction characteristics. For example, when generating the GUI on user computing device 110, analytics server 102 may display the nodes as having one or more visual attributes based on the data used to generate the set of nodes. Analytics server 102 may determine a particular combination of shape, color, and size or the like of a node to indicate an entity type of each node in the set of nodes, and display each nodes with one or more visual attributes (shape, color, size, or the like) associated with the entity type determined by analytics server 102. For example, a node determined by analytics server 102 to be associated with an entity such as a bank may have a small blue node with a bank-shaped icon. A node determined by analytics server 102 to be associated with a credit-based entity may be represented by a small yellow node with a credit card-shaped icon. In another example, a node determined by analytics server 102 to be associated with an IP address through which an online transaction takes place may be illustrated as a small green node with a map-marker icon. Such visual attributes may be customizable to the user accessing the GUI. A user may submit a request from the user computing device 110 to analytics server 102 to create, change, and save different visual attribute settings for different entity types.

The GUI displayed on user computing device 110 may further include a plurality of graphical components generated by analytics server 102 in the interconnected nodal data structure. For example, the graphical components may link the nodes displayed on user computing device 110 to indicate on the GUI that a transaction has taken place between both entities (e.g., nodes) to which the graphical component is connected. The graphical component may be a shape such as a line connecting two nodes associated with two separate entities, but is not limited as such. The graphical component may display visual attributes associated with characteristics of the transaction it represents. For example, the visual attributes of the graphical component may indicate a transaction type (e.g., deposit, withdrawal, transfer, payment, etc.), whether or not the transaction was successful, or that a plurality of transactions has occurred between the two entities for which analytics server 102 receives transaction data. Such visual attributes may a color, pattern, thickness or an arrow direction of the graphical component, all of which may be varied by analytics server 102. Such visual attributes may be customizable to the user accessing the GUI. A user may submit a request from the user computing device 110 to analytics server 102 to create, change, and save different visual attribute settings for different transaction types.

The system 100 may be configured to perform identification of fraudulent transactions through the detection of fraudulent transaction characteristics. According to some embodiments, analytics server 102 may detect fraudulent characteristics of a transaction from any of the data stored by analytics server 102 in server database 112 or database 108. The potentially fraudulent characteristics may be based on the transaction characteristics (a time, an amount, a location, an entity, a type, or a status of a transaction). An entity or transaction may be deemed fraudulent if the transaction took place outside a defined time period (e.g., normal waking hours), if a transaction amount surpassed a predetermined threshold set by the user (e.g., a credit limit), if a transaction took place in a new location (e.g., out of a user's ordinary state or country), if the entity has been previously identified as fraudulent or suspicious, or if the transaction is unsuccessful (e.g., a bounced check). For example, if analytics server 102 determines that two transactions involving a user occur within a predetermined amount of time and are greater than a predetermined distance apart (e.g., two merchants located in different states or countries), analytics server 102 may deem at least one of those two transactions fraudulent. When identifying a transaction as fraudulent, analytics server 102 may update the visual attributes of the entities and graphical component associated with the fraudulent transaction to reflect its fraudulent status.

The system 100 may be configured to use identified fraudulent transactions to determine whether an entity is potentially fraudulent. For example, analytics server 102 may determine that an entity has a number of transaction identified as fraudulent. When the number of fraudulent transactions associated with an entity reaches a predetermined threshold, analytics sever 102 may identify the entity as a fraudulent entity. Analytics server 102 may update the information stored in database 108 or server database 112 to reflect the fraudulent entity status. In addition, analytics server 102 may deem all future transactions with that entity as fraudulent as result of the fraudulent entity status. When such an entity is displayed on the GUI in associated with the selected graphical node, analytics server 102 may update the visual attributes of the same graphical node to indicate the electronic device associated with the entity is fraudulent. For example, analytics server may cause the GUI to display fraudulent entities as red. The analytics server 102 may identify fraudulent transactions and entities from the set of graphical nodes either directly or indirectly linked to the selected node.

Analytics server 102 may further determine, from the presence of fraudulent transactions or entities, that a particular entity is practicing money laundering. This may be accomplished by identifying a number of transactions routing currency to a particular entity (e.g., a single graphical node) which then appears to redistribute the transactions to known fraudulent entities or entities having fraudulent characteristics. In some embodiments, this may be achieve by analytics server 102 determining that an exact transaction amount is carried through several linked transactions (e.g., routed through different accounts) before arriving at an entity displaying fraudulent characteristics or different in type than the initial entity with which the transaction took place. Analytics server 102, upon making such a determination, may cause user computing device 110 to display a notification on the GUI informing the user of a potentially money-laundering entity. In addition, analytics server 102 may update the visual attributes of the entity and associated transactions to reflect such a determination.

The analytics server 102 may vary the visual attributes of the nodes or the graphical components based on a time, an amount, a location, an entity, or a status of a transaction. For example, visual attributes may be determined based on whether the associated transaction took place outside a defined time period (e.g., normal waking hours), whether the amount of the associated transaction surpassed a predetermined threshold set by the user (e.g., a credit limit), whether the transaction took place in a new location (e.g., out of a user's ordinary state or country), whether the entity has been identified as fraudulent or suspicious, or whether or not the transaction is successful. For example, if a transaction is unsuccessful, analytics server 102 may display the graphical component representing the transaction and the associated entities in a particular color, such as red. Analytics server may also adjust a shape of the nodes to reflect the status of the transaction as unsuccessful. Visual attributes may be adjusted during operation of the visualization tool by analytics server 102, which updates the interconnected nodal data structure displayed on user computing device 110 accordingly. Furthermore, a user may create, delete or otherwise alter combinations of visual attributes to customize the GUI. Such changes may be stored in the server database 112 associated with the user and user preferences.

Analytics server 102 may display the plurality of graphical components and plurality of graphical nodes simultaneously. For example, when the GUI displayed on user computing device 110 is loaded onto the screen by analytics server 102, the GUI may load as a prepopulated display including any graphical nodes and corresponding graphical components identified/determined by analytics server 102 prior to display of the GUI. Moreover, when displaying the GUI, analytics server 102 may be programmed to display the nodes at a predetermined distance from one another such that the nodes are distributed across the display. The embodiments herein are not limited to this configuration.

The system 100 may use database 108 as a non-volatile memory. Database 108 may be communicatively coupled to network 104 and configured to store information received from any of the client computing devices 106a-d, analytics server 102, or user computing device 110. For example, database 108 may store transaction data received from client computing devices 106a-d. Additionally, database 108 may store data generated by analytics server 102, such as a list of entities or a list of transaction amounts, locations, times, or the like. Analytics server 102 may rely on database 108 for the storage of data structures used to build the interconnected nodal data structure to be displayed on user computing device 110.

In addition, database 108 may store information related to users of system 100, such as account information related to system 100 and various financial accounts associated with each user. For example, when a user accesses system 100 via user computing device 110, analytics server 102 may prompt the user to input credentials such as a username and password (or other personal identifiable information) to access system the 100. After verification of the credentials by analytics server 102, database 108 may store the verified credentials associated with the user and any associated transaction information. While operating system 100, a user may input financial account information to enable analytics server 102 to characterize incoming transactions as associated with a particular financial account. Such accounts may include bank accounts, mobile or online currency exchange application accounts, or cryptocurrency accounts for which the user enters credentials to be stored in database 108.

A user may access the GUI created by analytics server 102 through user computing device 110. For example, user computing device 110 may include one or more input devices configured to receive inputs from the user, such as a keyboard, mouse, touchpad, or the like, and at least one output device, such as a display. During operation of system 100, user computing device 110 receives a command from analytics server 102 to display the GUI complete with the graphical nodes and graphical components. A user may interact with the nodes displayed on the GUI in the following manner. A user may hover over or select a node using a cursor, which prompts analytics server 102 to display entity information and transaction information in a pop-up box adjacent to the graphical node selected or over which the user is hovering. A user may want to redistribute the nodes or move them around, and may click and drag the graphical nodes using the cursor to a different location on the GUI, causing analytics server 102 to update the display accordingly, including changing positions of the graphical components connecting the adjusted nodes. Analytics server 102 may also display a toolbar on the GUI for filtering the transactions or entities displayed. In other words, a user has the ability to filter the display according to any characteristic of the transaction or the entity. In an embodiment where the user has linked multiple financial accounts to system 100, the user may further be able to filter according to a particular account.

FIG. 2 illustrates a method 200 for visually representing and tracking transactions on a graphical user interface, according to an embodiment. Method 200 comprises a series of steps performed by a system similar to that described above with reference to FIG. 1. For ease of description, method 200 will be described by way of examples. However, method 200 is not limited to the example described herein.

Method 200 may begin with a step 202, where the analytics server may receive data corresponding to a plurality of transactions between pluralities of electronic devices. The data corresponding to the plurality of transaction may include a time, a location, an amount, a transaction type, an entity type of the nodes between which a transaction took place, attributes of the originating account (e.g., an account number), attributes of the receiving account (e.g., an account number), whether the transaction was cryptocurrency or fiat currency (e.g., currency issued by a government entity such as dollars, euros, etc.), whether the transaction took place through a transaction platform, or the like for each transaction in the set of transactions.

By way of a first example of method 200, a user operating a device such as an ATM makes a cash withdrawal from a bank account associated with the user. A user may input transaction information by inserting a debit card associated with the bank account into the ATM, which links the transaction to an identifier of the bank account. During the transaction, the ATM may register a time, location, and entity associated with the transaction, such as a timestamp, a geographical location or ATM identifier, and the bank associated with the debit card. The ATM may or may not be specific to a banking entity. The ATM may transmit a data packet over a network such as that described with reference to FIG. 1. The data packet may include transaction information such as a user identifier, the timestamp, the ATM identifier or geographical location of the ATM, the bank, and an amount of the transaction. A similar process occurs for each transaction completed by the user.

By way of a second example of method 200, a first user operating a first electronic device such as a smart phone or PC uses a currency transfer platform to send currency to a second user operating a second electronic device, which may also be a smart phone or an ATM. At least one of the first electronic device or the second electronic device creates a data packet during the transaction including transaction information such as identifiers for both users and/or both electronic devices, platform information, platform account information, a location, an amount, a timestamp, or the like. During the transaction, the first or second electronic device may transmit the data packet over the network. The second user may have an option to receive the currency as virtual currency through the platform at the second electronic device or to cash the currency. When choosing the latter, the second user can designate an ATM or bank at which to pick up the transfer in cash.

The step 202 may be performed by a database and an analytics server such as those described with reference to FIG. 1. In the first example, step 202 may include receiving the data packet transmitted by the ATM at the database, which stores the data packet for future access by the analytics server. In a similar manner, step 202 of the second example may include receiving the data packet transmitted by either the first or second electronic device at one of the database or the analytics server. The analytics server may access any data stored in the database periodically (e.g., after a predetermined time has elapsed) or upon request from a user accessing the analytics server using a user computing device such as that described with reference to FIG. 1. Alternatively, the ATM used to perform the transaction may transmit a notification over the network to the analytics server, which the analytics server may use as a prompt to pull the data from the database.

Method 200 may continue with a step 204, where the analytics server may assign a plurality of graphical nodes respectively to the plurality of electronic devices. In step 204, the analytics server determines electronic devices representing entities involved in a plurality of transactions associated with the user. For example, analytics server may assign a graphical node to the ATM and any other entities with which the user attempted a transaction. Each graphical node may have a specific color, shape and size combination, and may include a particular icon marking it as a specific entity type. For the ATM from which the user withdrew cash in the first example, a blue node including a bank icon, indicating that the user withdrew money from a bank account may be assigned. The user is also assigned a graphical node, such as a gray circle with a person-shaped icon. For the smart phone used by the first user and/or second user in the second example, the analytics server may assign similar nodes to that assigned to the user of the first example. These graphical nodes may have preset color, shape, and size combinations set by the analytics server, but may be customizable by the user or a system administrator.

At step 204, the analytics server retrieves and parses the data packet to access the transaction information within the data packet. The analytics server then uses the transaction information (amount, location, entity type, transaction type, etc.) to assign a graphical node having visual attributes (color, shape, size) matching the transaction information. The analytics server may be coupled to a server database such as that described above with reference to FIG. 1. The analytics server may store the visual attributes assigned to the graphical node in the server database or the system-level database associated with the transaction information.

Method 200 may continue with a step 206, where the analytics server displays the plurality of graphical nodes as selectable objects on a graphical user interface (GUI) of the user computing device. The analytics server, upon assigning the graphical nodes in step 204 to the plurality of electronic devices, displays the graphical nodes on the user computing device to the user. The nodes are displayed on an interactive GUI such that a user may customize them according to the user's preferences.

The nodes may be displayed as selectable objects where the analytics server may monitor whether the user is interacting with each node. Using interactions allowed on the GUI, the end may customize and revise the nodes. For instance, the user may filter, rearrange, or otherwise customize the visualization of the nodes on the GUI. "Selectable," as used herein, refers to allowing the user to interact with (e.g., select) the graphical indicator. For instance, the analytics server may allow a user to use an input device (e.g., mouse) to hover over or select a node using a cursor, which prompts the analytics server to display entity information and transaction information in a pop-up box adjacent to the graphical node selected or over which the user is hovering. Additionally, a user may click and drag on a node using the cursor to move the graphical nodes to different locations on the GUI. In such an embodiment, the analytics server will update the display the nodes accordingly.

The step 206 may further include displaying a toolbar on the GUI for filtering graphical nodes displayed according to transaction characteristics. A user may choose to filter the display according to any characteristic of the transaction. Such filters may also cause the GUI to display only a certain number of transactions or nodes at one time based on time period, location, entity type, transaction type or account association.

Method 200 may continue with a step 208, where the analytics server displays a plurality of graphical components linking one or more of the plurality of graphical nodes on the GUI. The plurality of graphical components may be a shape such as a line linking two graphical nodes, and may include visual attributes associated with characteristics of the transaction, such as transaction type (e.g., withdrawal, deposit, transfer, etc.), amount, location, or the like. Such transaction characteristics are reflected using various visual attributes such as dotted-line pattern, thickness, arrow direction, color or length of the graphical component. Such visual attributes may be customizable by the user in the GUI. In the first example, when withdrawing cash from an ATM as described with reference to the above method steps, the graphical component may appear as a green line with an arrow pointing back towards the user, indicating that the user received cash. In the second example, when transferring currency from the first user to the second user, the graphical component may appear as a gray line. An arrow may also be present pointing from the graphical node representing the first user to the graphical node representing the second user on the GUI.

In some embodiments of step 208, a single graphical component can represent multiple transactions between the two associated entities, which may be displayed by including a number of darker colored dots distributed along the length of the graphical component (e.g., the line) indicating multiple transactions have taken place between the associated graphical nodes. The various embodiments may also provide functionality enabling the user to hover over a graphical component to display a list of transactions having taken place between the two associated graphical nodes.

Similar to the graphical nodes described in step 206, the graphical components displayed on the GUI are dynamically adjusted when the associated graphical nodes are moved by the user to a different location. For example, in moving one graphical node connected to a first end of the graphical component, the graphical component (e.g., the line connecting the nodes) will dynamically adjust length and direction to accommodate the new location of the graphical node.

Step 206 and step 208 of method 200 may occur simultaneously, such that the analytics server causes the GUI to display the set of graphical components and the set of graphical nodes simultaneously to the user. At steps 204 and 206 in the first example, the analytics server displays the graphical nodes assigned to the user and the ATM on the GUI connected by a graphical component such as a line. Similarly, in the second example, the analytics server displays the graphical nodes assigned to both the first and second users connected by a line-shaped graphical component.

Method 200 may continue with a step 210, where the analytics server receives a selection of a graphical node from a user interacting with the GUI. When the user selects the graphical node by interacting with the GUI, the GUI may zoom in on the selected node and surrounding nodes when clicked. Additionally or alternatively, the GUI may display information associated with the selected graphical node, such as an associated username used as a login credential to the GUI. The display may be filtered to display only a certain number of transactions or nodes at one time based on time period, location, entity type, transaction type, or account association. The interface may also be filtered to display graphical nodes based on their relationship to the currently selected node, such as directly linked or indirectly linked to a certain degree of separation (e.g., a certain number of transactions removed from the selected graphical node).

As described herein, the user viewing the GUI provided by the analytics server may customize the views, such that the analytics server analyzes a series of transactions associated with a particular entity (e.g., payer, payee, and/or a particular ATM). For instance, the user may instruct the analytics server to focus its analysis on a particular graphical node that represents a particular user. As will be described below, the analytics server then focuses on transactions that are directly or indirectly linked to the selected user.

Method 200 may continue with a step 212, where the analytics server displays a plurality of graphical nodes directly linked by a corresponding plurality of graphical components to the selected graphical node. Step 212 may occur responsive to step 210. Directly linked nodes are nodes having a transaction that directly links the node to the selected node, and indicate an entity with whom the selected node had a direct transaction. With reference to the first example, if the graphical node representing the user is selected, the directly linked node representing the ATM will remain displayed on the GUI. Any other graphical nodes not otherwise associated with the selected node may disappear upon selection. Thus, in the second example, when either the graphical node representing the first or second user is selected, the unselected graphical node may remain on the screen as a directly linked node to the selected node.

Method 200 may continue with a step 214, where the analytics server displays a visual attribute of each of the plurality of graphical components directly linked to the selected graphical node. Step 214 may occur responsive to step 210. In some embodiments, only the visual attributes of graphical components directly linked to the selected graphical node are displayed to save on processing time of the analytics server and to prevent the GUI from becoming overly populated with different visual attributes. In some embodiments, the directly linked graphical components may include visual attributes in addition to those described above with reference to step 208. For example, the directly linked graphical components may have attributes indicating whether a transaction was successful or fraudulent. A user may filter the types of visual attributes displayed and when to display them. Depending on the filtering settings of the user, all graphical components have visual attributes (some may have more than others depending on transaction information and whether direct or indirect transaction), some graphical components have some visual attributes, or no graphical components have visual attributes. Embodiments of method 200 include all such possibilities.

Method 200 may continue with a step 216, where the analytics server displays a plurality of graphical nodes indirectly linked by a plurality of graphical components having at least one degree of separation from the selected graphical node. Step 216 may occur responsive to step 210. Nodes that are indirectly linked nodes are nodes separated from the selected node by at least one transaction, meaning an entity with which the selected node brokered a transaction has brokered a second, possibly related transaction with a second entity represented by a separate node. Such a function allows the user to see potentially related transactions, and whether a related transaction may have been brokered with a fraudulent entity. During step 216, the GUI can inform the user of whether or not any closely related transactions to the current node occurred with a fraudulent entity or includes fraudulent characteristics. The GUI is a way for the user to more broadly determine if their typical transactions are through fraudulent entities, and can give the user an idea of where currency is being routed.

Figure 3A:
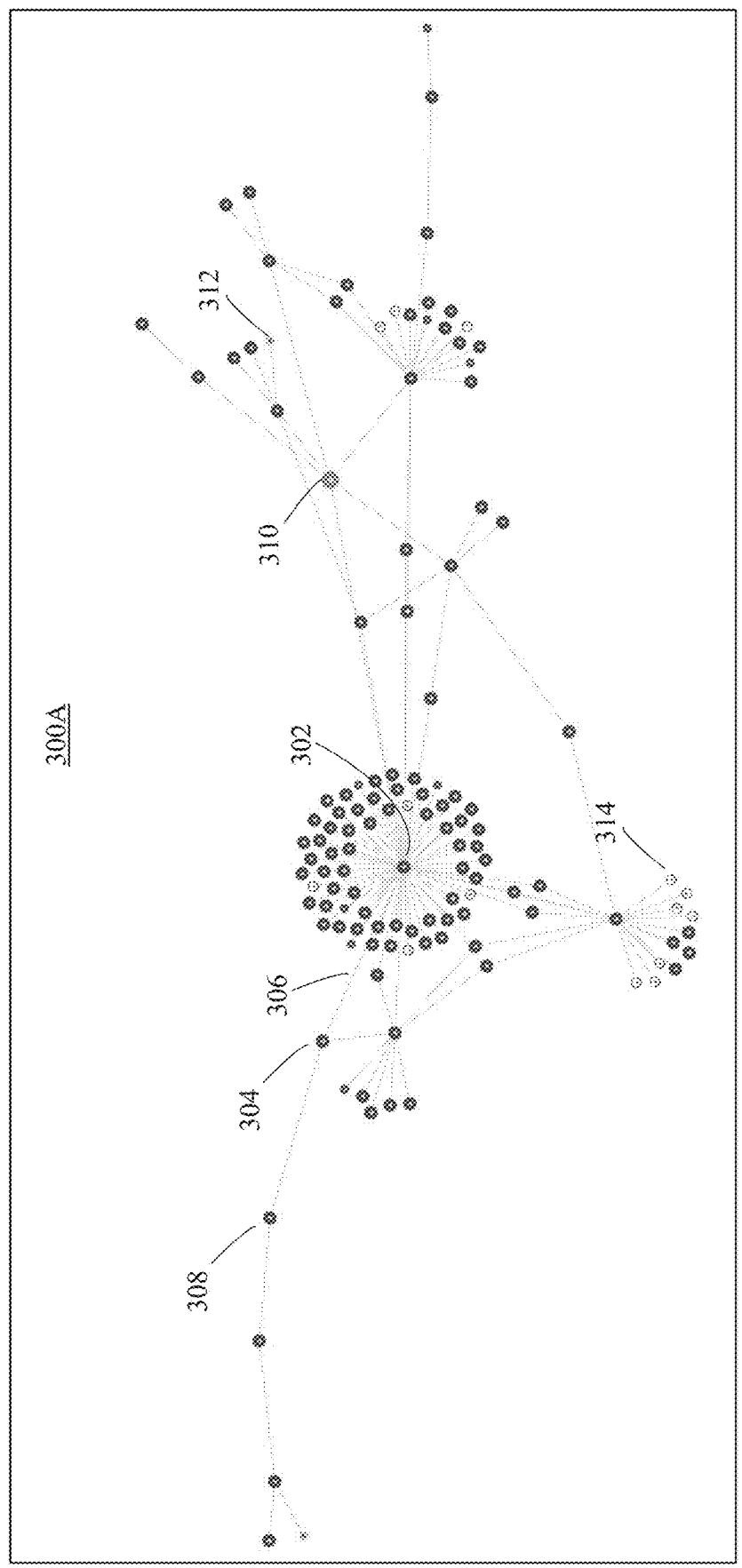
FIG. 3A-3C illustrate graphical user interfaces (GUIs) generated by a transaction visualization system, according to an embodiment.
Figure 3B:
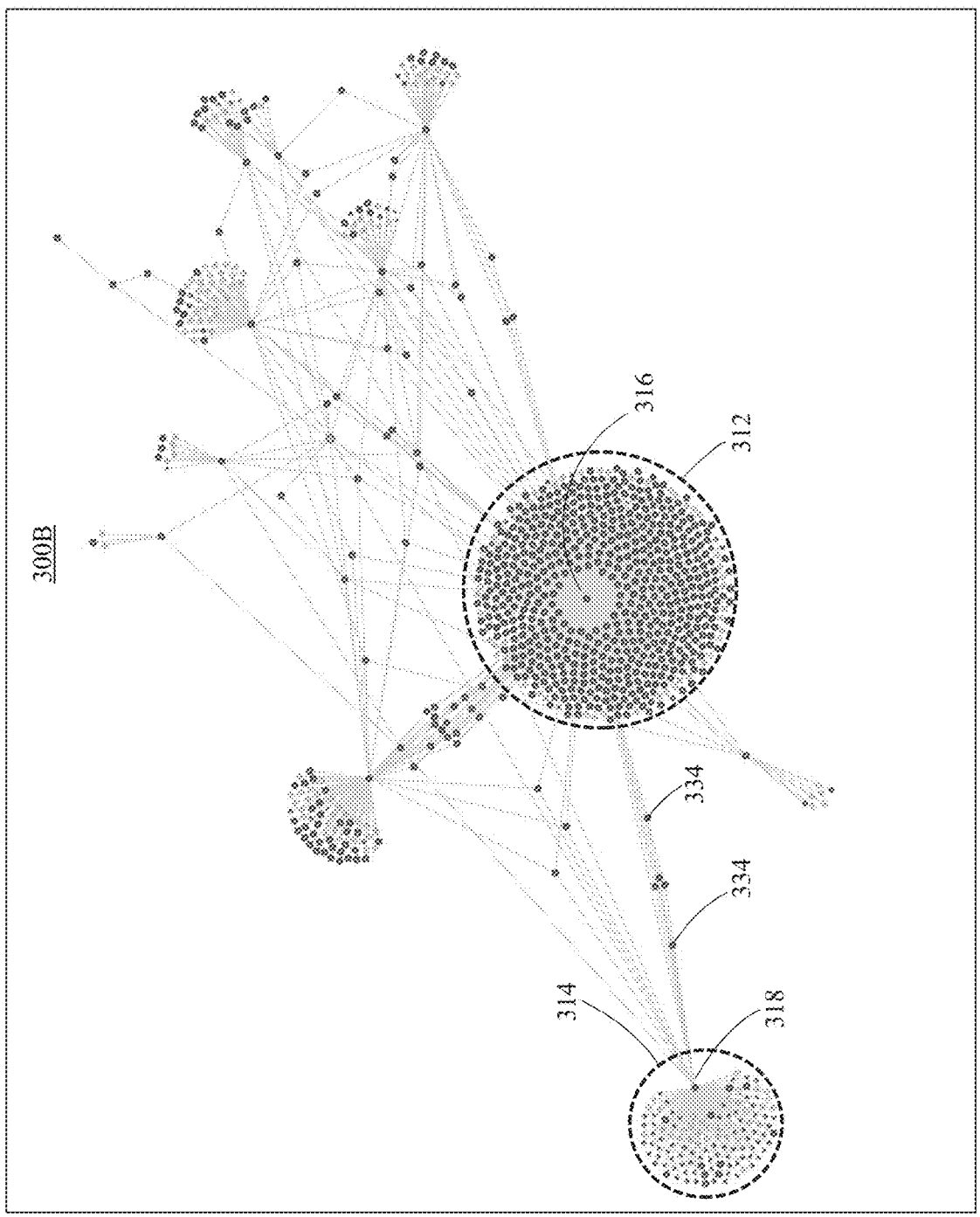
Figure 3C:
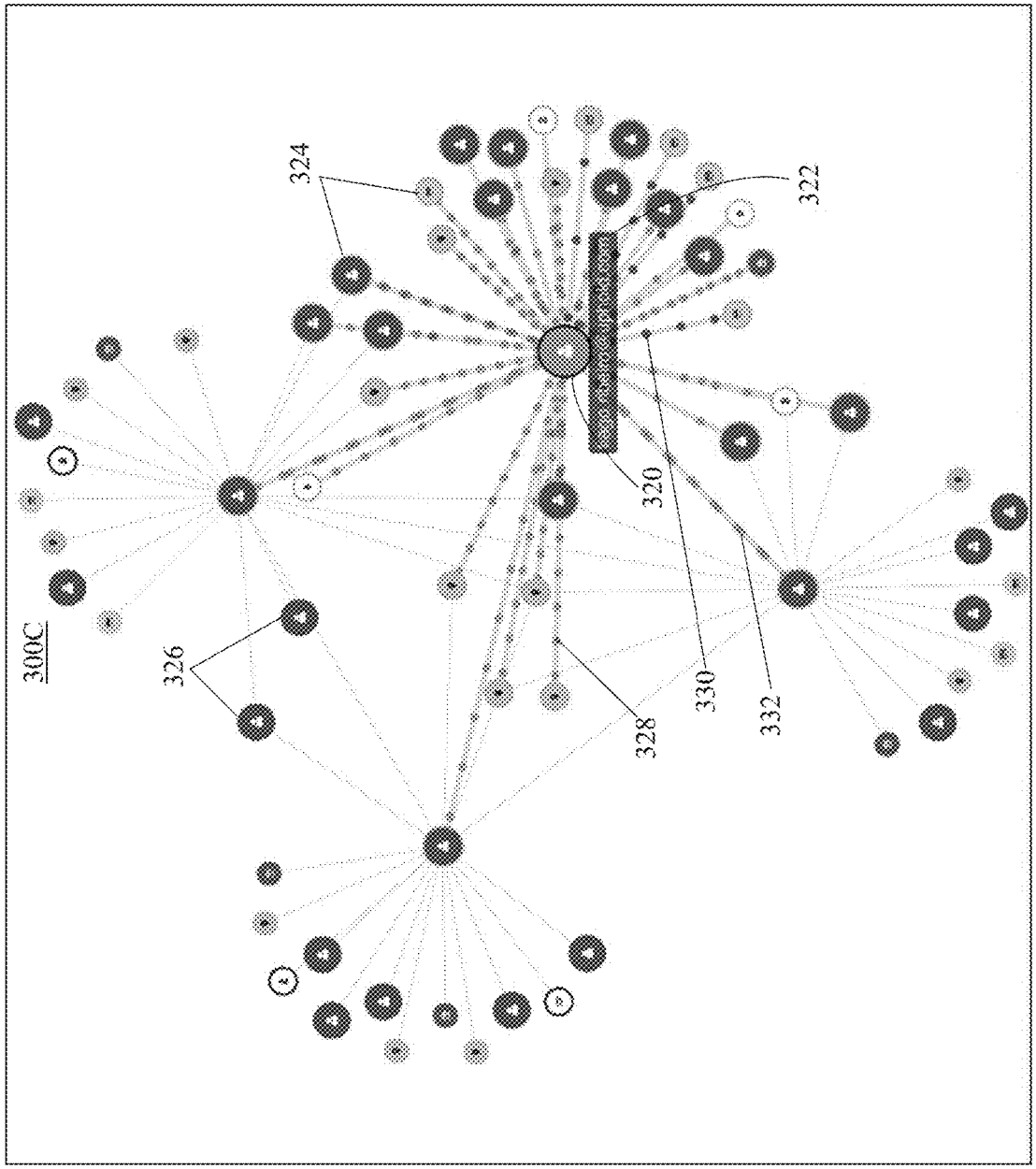

In addition to the description above, FIG. 3C provides a non-limiting example of the analytics server implementing the steps 210-216 of method 200.

Method 200 may end with the completion of step 216, at which point the analytics server may repeat method 200, either immediately or after a predetermined period of time has elapsed. In some embodiments, method 200 may only take place responsive to receiving a request from a user computing device to display the GUI on the user computing device. Upon receiving such a request, method 200 will begin again with step 202, in which the analytics server requests and receives transaction data from the database.

The method 200 may further include the analytics server identifying fraudulent transactions through detection of fraudulent transaction characteristics. According to some embodiments, the analytics server may detect fraudulent characteristics of a transaction from any of the data stored in an accessible database. The potentially fraudulent characteristics may be based on the transaction characteristics (a time, an amount, a location, an entity, a type, or a status of a transaction). An entity or transaction may be deemed fraudulent if the transaction took place outside a defined time period (e.g., normal waking hours), if a transaction amount surpassed a predetermined threshold set by the user (e.g., a credit limit), if a transaction took place in a new location (e.g., out of a user's ordinary state or country), if the entity has been previously identified as fraudulent or suspicious, or if the transaction is unsuccessful (e.g., a bounced check). For example, if two transactions involving a user occur within a predetermined amount of time and are greater than a predetermined distance apart (e.g., two merchants located in different states or countries), the analytics server may deem at least one of those two transactions fraudulent, thereby identifying a transaction as fraudulent. Method 200 may further include updating the visual attributes of the entities and graphical component associated with the fraudulent transaction to reflect its fraudulent status.

The method 200 may further include the analytics server identifying fraudulent transactions to determine whether an entity is potentially fraudulent. For example, if an entity has a number of transactions identified as fraudulent, and the number of fraudulent transactions reaches a predetermined threshold, the analytics server may identify the entity itself as fraudulent. In such a case, all future transactions with that entity may be marked as fraudulent as result of the fraudulent entity status. When such an entity is displayed on the GUI as associated with the selected graphical node, method 200 may include updating the visual attributes of the same graphical node to indicate the electronic device associated with the entity is fraudulent, such as causing the GUI to display such entities in red. The identified fraudulent transactions and entities may be only from the set of graphical nodes either directly or indirectly linked to the selected node.

The method 200 may further include the analytics server determining, from the presence of fraudulent transactions or entities, that a particular entity is practicing money laundering. This may be accomplished by identifying a number of transactions routing currency to a particular entity (e.g., a single graphical node) which then appears to redistribute the transactions to known fraudulent entities or entities having fraudulent characteristics. This may be achieve by the analytics server determining that an exact transaction amount is carried through several linked transactions (e.g., routed through different accounts) before arriving at an entity displaying fraudulent characteristics or different in type from the initial entity with which the transaction took place. Upon making such a determination, the method may further include updating the GUI to display a notification informing the user of a potentially money-laundering entity. The visual attributes of the entity and associated transactions may also be updated to reflect such a determination.

FIGS. 3A-3C illustrate different embodiments of a user interface 300 on which a server, such as analytics server 102 described with reference to FIG. 1, displays the interconnected nodal data structure. User interface 300 is a graphical user interface that may be displayed on, for example, user computing device 110 described with reference to FIG. 1. These embodiments are for explanation purposes only; user interface 300 is not limited to the embodiments and examples described herein. Even though aspects of the graphical/visual components are described as having different colors, it is expressly understood that the concepts described herein are not limited to these colors. Different graphical components (e.g., nodes) can be shown as visually distinct using a variety of methods (e.g., different colors and/or shapes).

FIG. 3A illustrates a first example of user interface 300, interface 300A, displaying an interconnected nodal data structure. Interface 300A is a graphical user interface (GUI), which may be displayed on any type of user computing device including a display, such as a personal computer (PC), smart phone, or other display device. Interface 300A includes a node 302 and a node 304 directly linked via a line 306. Line 306 is a graphical component indicating that a transaction has taken place between nodes 302 and 304. Interface 300A includes a plurality of other nodes, including a node 308, a node 310, a node 312, and a node 314. Node 308 is an example of a node indirectly connected to node 302. Node 310 is an example of a node representative of a user among many users utilizing the transaction tracking platform hosted or otherwise provided by the analytics server. Nodes 312 and 314 are examples of nodes with differing transaction characteristics and differing entity types. As can be seen in FIG. 3A, interface 300A can display any number or combination of graphical nodes linked by graphical components.

The embodiments described herein are not limited to a user operating interface 300. A system administrator may access and operate interface 300 in much the same way as a user. For example, the analytics server can use the methods and systems described herein to visualize interconnected transactions among various users such that a system administrator can readily identify clusters of transactions, transaction information, or indications of fraudulent entities or money-laundering within the interconnected nodal data structure. The system administrator can reorder the nodes manually or using different filters to control the user interface 300 to display graphical nodes of interest and related nodes and transactions. In addition, upon determining that a particular node may be fraudulent or participating in money-laundering practices, the interface 300 may offer the system administrator an option to alert users with whom the fraudulent entity brokered transactions through a notification distributed by the analytics server. Such an alert may also be communicated to local authorities through the analytics server, which may be configured to send an alert via electronic mail or short message service (SMS) to an electronic mail address or phone number stored in the database.

Nodes 302 and 304 are nodes including a person-shaped icon, thereby representing the electronic devices of two users or personal entities. Node 310 may be a presently selected node. Node 310, although similar in appearance, is larger and may differ in color to differentiate from nodes 302 and 304 in order to indicate the node as a selected node. Nodes 312 and 314 display visual attributes indicating that they are different entity types from nodes 302, 304, 308 and 310. Node 312 is representative of a credit card transaction or transaction with a credit entity, an indicated by the credit card icon in the center of the graphical node. Node 314 is representative of a cryptocurrency transaction, be that a cryptocurrency transaction or a transaction with a cryptocurrency entity. The interconnected nodal data structure can be filtered by the user accessing the GUI to display nodes and associated transactions based on merchant, transaction type, entity type, location, and/or currency type.

FIG. 3B illustrates a second example of user interface 300, interface 300B, displaying an intermodal data structure in which several nodal clusters are present. Interface 300B illustrates a nodal cluster 312 and a nodal cluster 314. Nodal cluster 312 includes a plurality of transactions, mostly successful, involving a node 316 disposed at the center of nodal cluster 312. Nodal cluster 314 includes a plurality of transactions involving a node 318. In interface 300B, the analytics server may display different nodes as visually distinct based on their corresponding transaction attributes. For instance, gray nodes may represent successful transactions, and red nodes may represent unsuccessful or fraudulent transactions. In other configurations, the analytics server may use other methods to visually distinguish between successful and unsuccessful transactions, such as by different shapes.

Node 316 is an example of a node representing an entity which interface 300B may not mark as fraudulent. As evidenced in FIG. 3B, the majority of transactions with which node 316 is involved in nodal cluster 312 are successful, as indicated by the gray color of the graphical components and nodes. Nodal cluster 312 also includes several unsuccessful transactions marked as credit card transactions, as indicated by the icon, which are possibly a result of insufficient funds or marked by credit company as fraudulent. Therefore, when viewing interface 300B, a user may easily determine that node 316 represent an entity that is unlikely to be fraudulent.

Node 318 is an example of an entity which interface 300B may mark as fraudulent or likely to be participating in money-laundering. As evidenced in FIG. 3B, the majority of transactions included in nodal cluster 314 are mostly unsuccessful or involve an entity (node) that has been marked by interface 300B as fraudulent, which may be indicated by a red color of the node. Of the successful transactions, most are with nodes representing cryptocurrency entities (represented by the white color of the graphical nodes), which could be deposits or withdrawals to cryptocurrency accounts where a trail of transactions ends. Only six nodes outside of nodal cluster 314 represent unsuccessful or fraudulent transactions as displayed on interface 300B in FIG. 3B. A system such as system 100 described with reference to FIG. 1 executing a method such as method 200 described with reference to FIG. 2 may make a determination that node 318 represents a fraudulent or money-laundering entity based on the number of fraudulent or unsuccessful transactions.

In one embodiment, a user of the interface 300B may desire to determine a relationship between two entities, one of which may be involved in fraudulent or questionable activity. The user may select a first entity, represented by node 316 and a second entity, represented by node 318. The interface 300B will present nodes 316, 318, as well as any nodes that connect node 316 to node 318, shown here as nodes 334. The interface 300B may also present all nodes that have a direct relationship in a nodal cluster (e.g., nodal cluster 312 for node 316). This interface may assist in a determination that node 316 does not directly transact with node 318, but nodes 316, 318 indirectly interact via nodes 334.

FIG. 3C illustrates a third example of interface 300, interface 300C, displaying the appearance of the GUI when a particular node is selected by the user, and serves as an illustrative example of steps 210 through 216 described above with reference to FIG. 2. Interface 300C includes a selected node 320, a pop-up 322, directly linked nodes 324, indirectly linked nodes 326, and graphical components 328, 330, and 332 having various visual attributes. When an analytics server, such as analytics server 102 described with reference to FIG. 1, receives a selection of a node 320 (such as in step 210), interface 300B may enlarge and outline selected node 320 to differentiate from unselected nodes. In some embodiments, selected node 320 is associated with the user operating interface 300C for which the visualization tool has aggregated transaction data. The analytics server may also display pop-up box 322 (or other type of text box, such as an overlay, which may be translucent to visualize items behind the text box), which may include information such as an entity name. Pop-up box 322 may also display a number of transactions associated with the selected change the view of the GUI to zoom in on selected node 320. For example, when a particular node is selected by the user or system administrator, the user may specify a degree of separation from the selected graphical node for the GUI to display. The analytics server may receive the request and cause the GUI to remove all nodes previously displayed on the GUI that are not within the specified degree of separation from the selected node, thereby only displaying related nodes of the interest to the user.

The GUI may display a plurality of graphical nodes directly linked by transactions to selected node 320, in accordance with step 212 described with reference to FIG. 2, such as directly linked nodes 324. In some embodiments, such as that depicted in FIG. 3C, any directly linked nodes 324 may have a visual attribute indicating that it is directly linked to selected node 320. In interface 300C, such a visual attribute is an orange outline encircling the graphical node.

The GUI may display a plurality of graphical components representing transactions, both directly and indirectly connected by transactions to selected 320, in accordance with step 214 described with reference to FIG. 2. In some embodiments, such as that depicted in interface 300C, transactions directly connected to selected node 320 are displayed as graphical components 328, 330, and 332 having various visual attributes. Graphical components 328, 330, and 332 may include various line patterns, colors, thicknesses, or the like indicating transaction information. For example, graphical component 328 is displayed as a line having several visual attributes, such as a first color, which may be gray, and a first dotted line pattern. The first color of graphical component 328 may indicate a successful transaction status. The first dotted line pattern of graphical component 328 may characterize the transaction as receiving funds (e.g., transaction involving withdrawal, credit, receipt of payment). Another example is graphical component 330, which is displayed as a line having a same line pattern as graphical component 328 to indicate a same transaction type (e.g., withdrawal). However, the color of graphical component 330 is different than that of graphical component 328 to indicate a different transaction status (e.g., successful or unsuccessful). The color of graphical component 330 may be a color such as red to indicate the transaction represented by graphical component 330 was unsuccessful. In yet another example, interface 300B displays graphical component 332 as a line having one same visual attribute indicating transaction status (e.g., color) as graphical component 328 and one different visual attribute indicating transaction type (e.g., pattern) from both graphical components 328 and 330. Graphical component 332 is displayed as a line have a second dotted line pattern different from the first dotted line pattern, which indicates that the transaction represented by graphical component 332 is a transfer (e.g., transaction involving a deposit, debit, or payment). The embodiments herein are not limited to such; any combination of features may be combined to customize graphical components 328, 330, and 332 to display visual attributes in accordance with preferences of the user.

The GUI may display transactions one or more degrees of separation away from the selected node, such as indirectly linked nodes 326, in accordance with step 216 described with reference to FIG. 2. The user can instruct the analytics server to display nodes to a specific degree of separation. Unlike directly linked nodes 324, indirectly linked nodes 326 are not connected to selected node 320 by a direct transaction, but may be connected in the interconnected nodal data structure to other indirectly linked nodes or to directly linked nodes 324. Indirectly linked nodes 326 may not display a visual attribute outside of the assigned graphical node features. In addition, any graphical component connecting two indirectly linked nodes or one indirectly linked node to one directly linked node may or may not display visual attributes such as those displayed for graphical components 328. All graphical nodes and components may be customized by the user through the GUI of interface 300 (and thus, interface 300C).

The system and method presented herein describe a software solution for visually representing and tracking transactions on a graphical user interface configured to display a holistic view of an interconnected nodal network detailing transactions linking a plurality of entities. Such a solution provides an alternative method of determining fraudulent entities or identifying potential money-laundering operations by displaying the final destination of some transactions. The software solution is in the form of a transaction visualization tool providing a user interface on which to display the interconnected nodal network. For example, each node in the interconnected data structure may represent a user or a device used for a transaction. Each node may be connected by one or more lines or similar graphical component linking two nodes indicating a transaction. The interconnected nodal data structure can be customized and filtered according to different search features such as time period, transaction type, entity type, or the like.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method of visually representing and tracking transactions on a graphical user interface, the method comprising:

receiving, by a server, data corresponding to a plurality of transactions between a plurality of electronic devices;

displaying, by the server on the graphical user interface, a set of graphical nodes representative of the plurality of electronic devices as selectable objects, each graphical node of the set of graphical nodes having a visual attribute corresponding to an attribute of a respective electronic device;

displaying, by the server on the graphical user interface, a set of graphical components linking one or more of the set of graphical nodes, each graphical component of the set of graphical components corresponding to a respective transaction of the plurality of transactions;

in response to receiving a selection of a graphical node from a user interacting with the graphical user interface:

displaying, by the server, a first subset of graphical nodes directly linked by a first subset of graphical components to the selected graphical node;

displaying, by the server, a visual attribute of each of the first subset of graphical components directly linked to the selected graphical node;

displaying, by the server, a second subset of graphical nodes indirectly linked by a second subset of graphical components having at least one degree of separation from the selected graphical node; and removing, by the server, from the graphical user interface, each node of the set of graphical nodes not included in the first subset of graphical nodes and the second subset of graphical nodes.

2. The method of claim 1, wherein the set of graphical components and the set of graphical nodes are displayed simultaneously.

3. The method of claim 1, wherein the plurality of transactions comprise an exchange of currency between at least two electronic devices of the plurality of electronic devices.

4. The method of claim 1, wherein each transaction of the plurality of transactions has an associated transaction type, and further comprising:

receiving, by the server, a selection of a transaction type; and displaying, by the server, only graphical nodes and graphical components associated with that transaction type.

5. The method of claim 1, further comprising:

receiving, by the server, a selection of a second graphical node; and displaying, by the server, every graphical component and every graphical node linking the graphical node and the second graphical node.

6. The method of claim 1, wherein each of the set of graphical components is a line, and the visual attribute of each of the first subset of graphical components is at least one of a color, pattern, thickness, or an arrow direction of the line.

7. The method of claim 1, wherein the visual attribute of each graphical node of the set of graphical nodes represents an entity type of the respective electronic device.

8. The method of claim 7, wherein the entity type is one of a registered user, a non-registered user, a bank, an automated teller machine, or a merchant.

9. The method of claim 1, further comprising identifying, by the server from the data, a plurality of transactions having fraudulent characteristics between the set of graphical nodes either directly or indirectly linked to the selected graphical node.

10. The method of claim 9, further comprising:

identifying, by the server, the plurality of transactions having fraudulent characteristics are directly or indirectly linked to a same graphical node of the set of graphical nodes; and updating, by the server on the graphical user interface, the visual attribute of the same graphical node to indicate the respective electronic device as a fraudulent entity.

11. A system configured to visually represent and track transactions, the system comprising:

a server comprising a non-transitory computer-readable memory and a processor, the server configured to receive data corresponding to a plurality of transactions between a plurality of electronic devices, the server also configured to present for display on a graphical user interface, the non-transitory computer-readable memory comprising instructions that when executed by the processor:

display a set of graphical nodes as selectable objects, each of the set of graphical nodes having a visual attribute corresponding to an attribute of a respective electronic device;

display a set of graphical components linking one or more of the set of graphical nodes, the set of graphical components corresponding respectively to the plurality of transactions; and in response to receiving a selection of a graphical node from a user interacting with the graphical user interface:

display a first subset of graphical nodes directly linked by a first subset of graphical components to the selected graphical node;

display visual attribute of each of the first subset of graphical components directly linked to the selected graphical node;

display a second subset of graphical nodes indirectly linked by a second subset of graphical components having at least one degree of separation from the selected graphical node; and remove, from the graphical user interface, each node of the set of graphical nodes not included in the first subset of graphical nodes and the second subset of graphical nodes.

12. The system of claim 11, wherein the server is configured to simultaneously display the set of graphical components and the set of graphical nodes.

13. The system of claim 11, wherein the plurality of transactions comprise an exchange of currency between at least two electronic devices of the plurality of electronic devices.

14. The system of claim 11, wherein each transaction of the plurality of transactions has an associated transaction type, and wherein the server is further configured to:

receive a selection of a transaction type; and display only graphical nodes and graphical components associated with that transaction type.

15. The system of claim 11, wherein the server is further configured to:

receive a selection of a second graphical node; and display every graphical component and every graphical node linking the graphical node and the second graphical node.

16. The system of claim 11, wherein each of the first or second subset of graphical components is a line, and the visual attribute of each graphical component in the first subset of graphical components is at least one of a color, pattern, thickness or an arrow direction of the line.

17. The system of claim 11, wherein the visual attribute of each graphical node represents an entity type of the respective electronic device.

18. The system of claim 17, wherein the entity type is one of a registered user, a non-registered user, a bank, an automated teller machine, or a merchant.

19. The system of claim 11, wherein the server is further configured to identify a plurality of transactions having fraudulent characteristics between the first or second subset of graphical nodes.

20. The system of claim 19, wherein, in response to the server identifying that the plurality of transactions having fraudulent characteristics are directly or indirectly linked to a same graphical node of the first or second subset of graphical nodes, the graphical user interface is further configured to update the visual attribute of the same graphical node to indicate the respective electronic device as a fraudulent entity.

\* \* \* \* \*